United States Patent [19]

Nakada et al.

[11] Patent Number: 5,069,932
[45] Date of Patent: Dec. 3, 1991

[54] METHOD OF WINDING UP A MAGNETIC RECORDING MEDIUM

[75] Inventors: Junji Nakada; Hideaki Takeuchi; Tadashi Yasunaga, all of Kanagawa, Japan

[73] Assignee: Fuji Photo Film Co., Ltd., Kanagawa, Japan

[21] Appl. No.: 683,626

[22] Filed: Apr. 11, 1991

[30] Foreign Application Priority Data

Apr. 13, 1990 [JP] Japan .................................. 1-97867

[51] Int. Cl.$^5$ ............................................. H01F 10/02
[52] U.S. Cl. ................................... 427/129; 427/128; 427/255.5; 427/282; 427/296; 427/398.2
[58] Field of Search ...................... 427/128, 129, 255.5, 427/282, 296, 398.2

Primary Examiner—Bernard Pianalto
Attorney, Agent, or Firm—Sughrue, Mion, Zinn, Macpeak & Seas

[57] ABSTRACT

A continuous polymeric substrate for a magnetic recording medium, on which magnetic material is deposited during which the end portions of both sides of the substrate is masked, is wound up on a wind-up roll in a vacuum atmosphere while the substrate is fluctuated in a width direction by a fluctuating width ranging from 0.2 mm to 40 mm in a fluctuating cycle ranging from 10 seconds to 1000 seconds.

7 Claims, 1 Drawing Sheet

F I G . 1
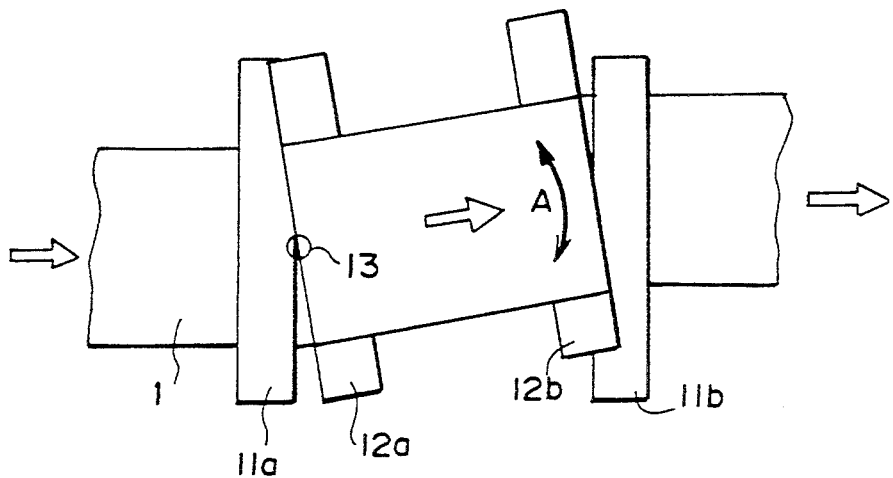
F I G . 2
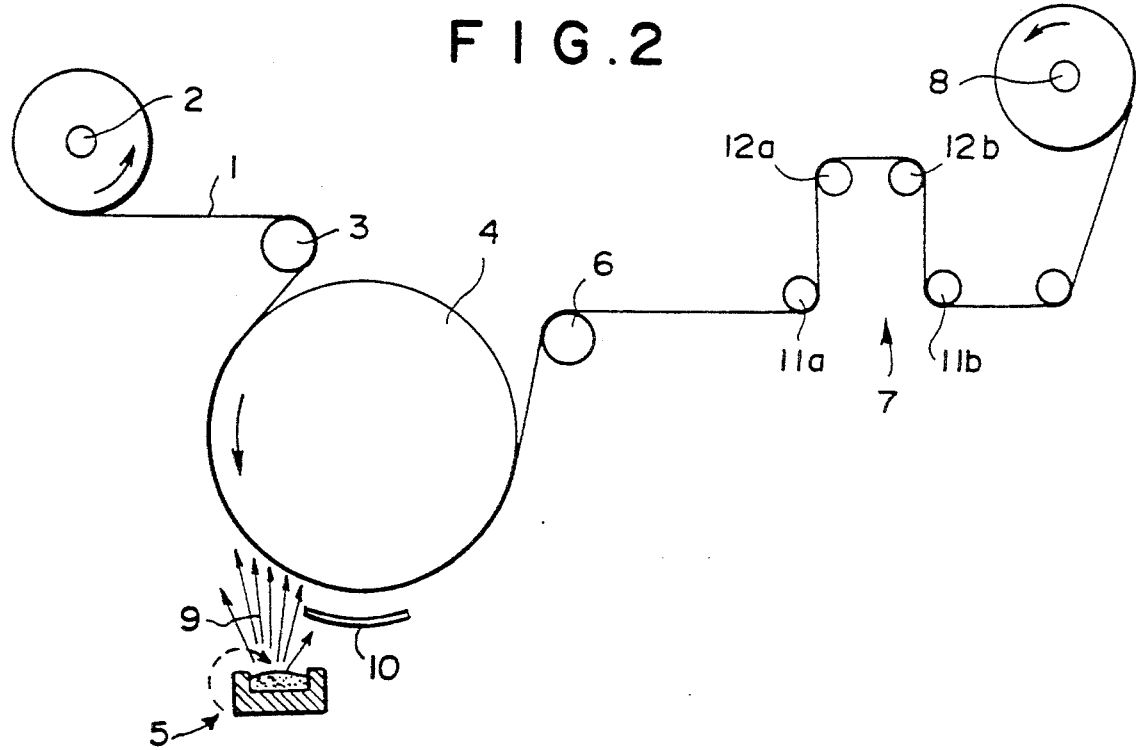

METHOD OF WINDING UP A MAGNETIC RECORDING MEDIUM

BACKGROUND OF THE INVENTION

1. Field of the Invention

The present invention relates to a method for winding up a magnetic recording medium, which comprises winding up a continuous polymeric substrate for the magnetic recording medium on which a magnetic layer is formed by a vacuum deposition procedure on a wind-up roll, and particularly the method in which the ends of both sides of the continuous polymeric substrate are masked during the vacuum deposition procedure.

2. Description of the Prior Art

Magnetic tapes with thin magnetic films thereon have drawn much attention due to the recent need for high density recording. The techniques for producing such magnetic tapes by means of a vacuum deposition procedure are well-known. The techniques comprise vacuum-depositing magnetic material on a continuous substrate while the substrate is applied on a rotating main drum for cooling, and thereafter winding up the substrate, on which a thin film-like magnetic layer is formed, on a wind-up roll. The vacuum deposition and winding-up processes are carried out in a vacuum atmosphere. In the case where such a substrate is wound up on a wind-up roll in a vacuum atmosphere, the ends of both sides of each reel of substrate are aligned with those of the other reels of substrate on the wind-up roll, whereby a raw winding roll on which the substrate with its both side ends aligned is produced, due to the air penetration into the interface between the respective adjacent reels of substrate being eliminated in the vacuum atmosphere.

When the magnetic material is vacuum-deposited on the substrate while the substrate is applied on the main drum, masking processing is applied to the regions each extending from the end portion of each side of the substrate toward the surface of the main drum. Accordingly, the magnetic material is deposited only on the central area on the substrate excluding the areas on the end portions of both sides of the substrate (hereinafter referred to as the side areas) each having a width from approximately several millimeters to scores of millimeters. This results in the varying thickness of the substrate in which the central area is thicker than the aforementioned side areas by the thickness of the magnetic layer.

The substrate which typically has a length of 4000-5000 m is wound up on a wind-up roll. Therefore, the difference in thickness between the central area and the side areas accumulates on an entire wind-up roll because of the winding effect of the substrate. Especially, in the case of the aforementioned techniques in which the substrate is wound up on a wind-up roll in a vacuum atmosphere, the difference in thickness between the central area and the side areas of the outermost reel of substrate on the wind-up roll is determined by the value which is calculated by multiplying the thickness of the magnetic layer by the number of revolutions around the wind-up roll, because no air is entrapped between the respective adjacent reels of substrate. Also, in this case, because the side ends of each reel of substrate are aligned with those of the other reels of substrate and because the boundaries between the central area and each of the side areas on each reel of substrate are aligned with the boundaries on the other reels of substrate, clear steps are generated at the respective boundaries on the outermost reel of substrate on the wind-up roll. Therefore, as the diameter of winding increases, defects such as winding wrinkles tend to appear at the aforementioned boundaries.

In view of the above problems, the general object of the present invention is to provide a method for winding up a magnetic recording medium in which winding wrinkles are prevented from occurring even when a continuous polymeric substrate for the magnetic recording medium having non-deposited areas on the end portions of both sides of the substrate is wound up in a vacuum atmosphere.

The specific object of the present invention is to provide a method for winding up a magnetic recording medium in which during winding up a continuous polymeric substrate for the magnetic recording medium on a wind-up roll the substrate is fluctuated relatively slowly in a width direction by a fluctuation range of at least 0.2 mm but at most 40 mm in a fluctuation cycle of at least 10 seconds but at most 1000 seconds thereby gradually shifting the position of each reel of substrate relative to the respective adjacent reels of substrate in a width direction, to prevent substantial steps from appearing at the boundaries between the central area and each of the side areas where the magnetic layer is not provided, and to eliminate the generation of winding wrinkles.

SUMMARY OF THE INVENTION

The method for winding up a magnetic recording medium in accordance with the present invention is characterized in that a continuous polymeric substrate for the magnetic recording medium, on which magnetic material is deposited during which the end portions of both sides of the substrate are masked, is wound up on a wind-up roll while in a vacuum atmosphere the substrate is fluctuated in a width direction by a fluctuation range of at least 0.2 mm but at most 40 mm at a fluctuation cycle of at least 10 seconds but at most 1000 seconds.

With the method for winding up a magnetic recording medium in accordance with the present invention in which during winding up a continuous polymeric substrate for the magnetic recording medium on a wind-up roll the substrate is fluctuated relatively slowly in a width direction by a fluctuation range of at least 0.2 mm but at most 40 mm in a fluctuation cycle of at least 10 seconds but at most 1000 seconds, the position of each reel of substrate is gradually shifted relative to the respective adjacent reels of substrate in a width direction. Accordingly, even as the diameter of winding increases, the difference in thickness between the section of the substrate having the deposit thereon and the section of the substrate having no deposit thereon is leveled off in a entire raw winding roll, thereby preventing substantial steps from appearing at the boundaries between the two sections. Therefore, the generation of winding wrinkles is eliminated.

BRIEF DESCRIPTION OF THE DRAWINGS

FIG. 1 illustrates a schematic view showing a portion of an apparatus for carrying out the method for winding up a magnetic recording medium in accordance with an embodiment of the present invention, and FIG. 2 illustrates a schematic view showing an overall configuration of the apparatus shown in FIG. 1.

DESCRIPTION OF THE PREFERRED EMBODIMENTS

The present invention will hereinbelow be described in further detail based on the preferred embodiments with reference to the accompanying drawings.

FIG. 2 illustrates a schematic view showing an apparatus for carrying out the method for winding up a magnetic recording medium in accordance with an embodiment of the present invention, and FIG. 1 illustrates an enlarged plan view showing a portion of the apparatus shown in FIG. 1. As shown in FIG. 2, in this embodiment a continuous polymeric substrate 1 is conveyed by the rotation of a roll 2 and is applied on a main drum 4 for cooling via inlet roll 3. The main drum 4 conveys the substrate 1 with the latter being in close contact with the peripheral surface of the former, during which magnetic material from a depositing means 5 is deposited on the substrate 1 that is being cooled. The substrate 1, on which a magnetic layer is formed by the aforementioned depositing procedure, is guided to a substrate fluctuating section 7 via an outlet roll 6, and then is wound up on a wind-up roll 8. A shielding plate 10 for controlling an incident angle of depositing vapor stream 9 to the substrate 1 is provided below the main drum 4. Also, although not shown in FIG. 2, a masking means for avoiding adhesion of the magnetic material to the end portions of both sides of the substrate 1 and the peripheral surface of the main drum 4 is provided between the depositing means 5 and the main drum 4.

The substrate 1 has a width W of about 500 mm, a thickness t of about 10 $\mu$m, a length of about 4000–5000 m and a surface roughness Ra of about 200 Å. The conveyance rate of the substrate is set as 100 m/min and the tension of the substrate 1 in a longitudinal direction when the substrate 1 is wound up on the wind-up roll 8 is set as 8 Kg/500 mm width. The main drum 4 has a diameter $D_1$ of 800 mm and the outlet roll 6 has a diameter $D_2$ of 80 mm. The thickness of the magnetic layer, which is formed on the substrate 1 by the depositing means 5, is 2000 Å.

When the substrate 1 is applied on the peripheral surface of the main drum 4 to carry out the deposition processing, it is necessary to prevent adhesion of the magnetic material to the peripheral surface of the main drum 4 in order to protect the main drum 4. Therefore, masking processing is applied to the regions each extending from the end portion of each side, i.e. the portion within 20 mm from the edge of each side, of the substrate 1 to the exposed surface portion of the main drum 4 by means of the masking means, and the magnetic material is deposited only on the central area (460 mm wide). Accordingly, in each reel of substrate, steps having a difference in height of 2000 Å appear at the boundaries between the central area and each of the side areas of the substrate 1. If such a substrate 1 having the steps is wound up on the wind-up roll, the steps are accumulated because there is no air being entrapped, and they become larger in proportion to the diameter of winding. This results in the generation of winding wrinkles on the outermost reel of substrate 1 on the wind-up roll 8.

In view of the above, in the method in accordance with the embodiment of the present invention, the substrate is fluctuated in a width direction in the substrate fluctuating section 7 so that the substrate 1 is being wound up on the wind-up roll in such a manner that the positions of the boundaries between the central area and each of the side areas in each reel of substrate is gradually shifted relative to the respective adjacent reels of substrate. The substrate fluctuating section 7 is typically EPC (edge position controlling) means, and comprises, as shown in FIG. 1, a pair of base rolls 11a, 11b and a pair of fluctuating rolls 12a, 12b, with the former being disposed below the latter. The fluctuating rolls 12a, 12b fluctuate around a base point 13 in directions indicated by an arrow A at a given angle and in a given cycle. Specifically, the substrate 1 is applied to the fluctuating rolls 12a, 12b via the base rolls 11a and is fluctuated in a width direction. Accordingly, when the substrate 1 is applied to the base roll 11b, the substrate 1 is shifted in a width direction in a reciprocating motion. The fluctuating cycle of the substrate 1 by the fluctuating rolls 12a, 12b is 600 seconds, and the fluctuating width of the substrate 1 by the fluctuating rolls 12a, 12b is 1 mm for each of the motions toward the right and the left. As a result of the fluctuation, when the substrate 1 is being wound up on the wind-up roll 8, the boundaries between the central area of the substrate 1 having the deposit thereon and each of the side areas of the substrate 1 having no deposit thereon in each reel of substrate is gradually shifted relative to the respective adjacent reels of substrate. Therefore, even if the diameter of winding increases, the difference in thickness between the central area and each of the side areas of the substrate 1 is leveled off in a entire raw roll, thereby preventing the generation of the great steps at the boundaries and thus eliminating the winding wrinkles.

The method for winding up a magnetic recording medium in accordance with the present invention is not restricted to the aforementioned embodiment and may be modified or changed in various ways. For example, the fluctuating cycle T of the substrate may be any value within the range from 10 seconds to 1000 seconds, and the fluctuating width l of the substrate may be any value within the range from 0.2 mm to 40 mm. Also, the fluctuating means may be various other types in addition to the type used in the aforementioned embodiment.

We claim:

1. A method for winding up a magnetic recording medium comprising winding up on a wind-up roll a continuous polymeric substrate for the magnetic recording medium, on which magnetic material is deposited during which the end portions of both sides of the substrate is masked, in a vacuum atmosphere while the substrate is fluctuated in a width direction by a fluctuating width ranging from 0.2 mm to 40 mm in a fluctuating cycle ranging from 10 seconds to 1000 seconds.

2. A method for winding up a magnetic recording medium as set forth in claim 1, wherein the magnetic material is deposited on the continuous polymeric substrate when the substrate is applied on a main drum for cooling.

3. A method for winding up a magnetic recording medium as set forth in claim 2, wherein the magnetic material is deposited on the substrate by a depositing means disposed below the main drum.

4. A method for winding up a magnetic recording medium as set forth in claim 3, wherein the end portions of both sides of the substrate is masked by a masking means disposed between the depositing means and the main drum.

5. A method for winding up a magnetic recording medium as set forth in claim 3, wherein an incident angle of depositing vapor stream from the depositing means to the substrate is controlled by a shielding plate disposed below the main drum.

6. A method for winding up a magnetic recording medium as set forth in claim 1, wherein the substrate is fluctuated by a fluctuating means.

7. A method for winding up a magnetic recording medium as set forth in claim 6, wherein the fluctuating means comprises a pair of base rolls and a pair of fluctuating rolls, which are disposed below the base rolls and fluctuate in a width direction around a base point at a given angle in a given cycle.

* * * * *